Figure 1:
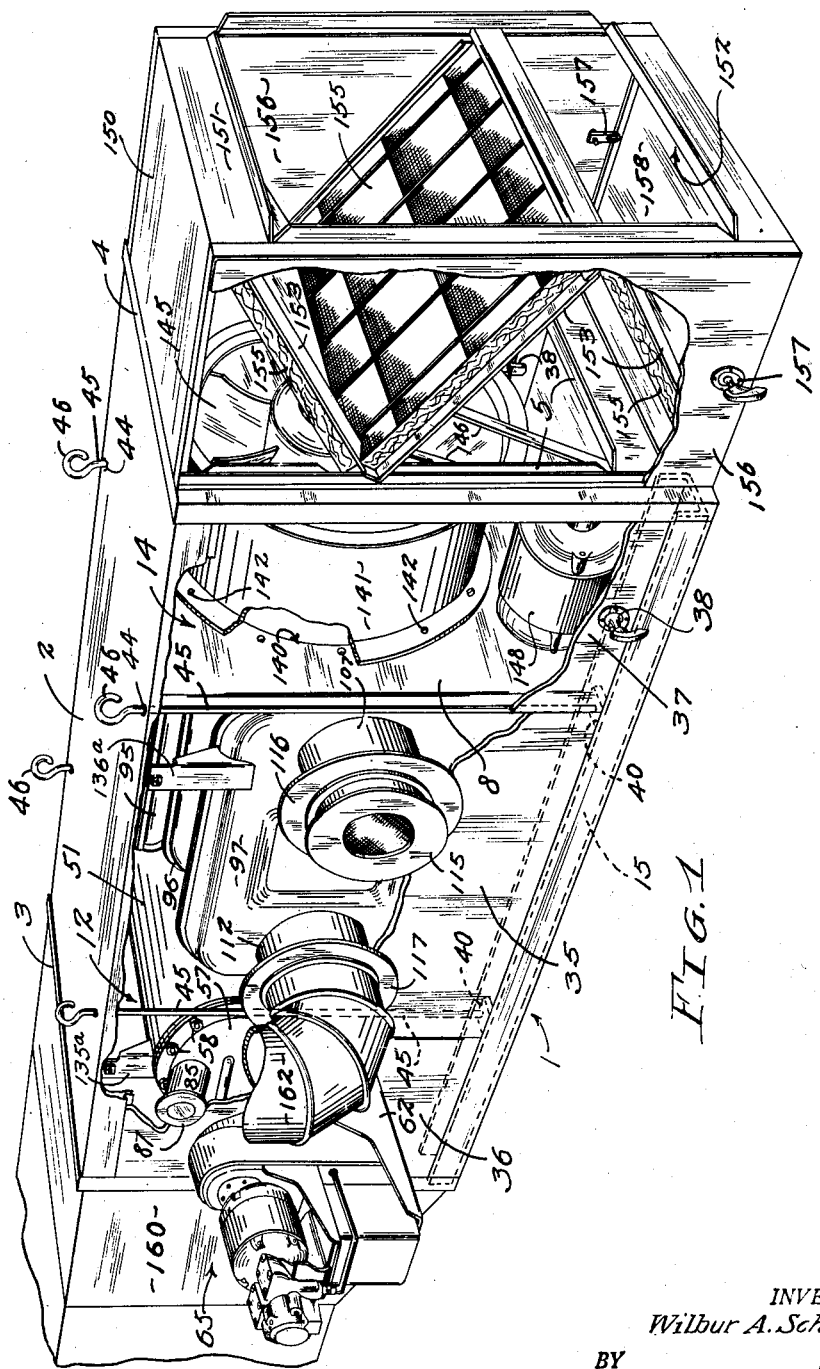

Jan. 8, 1952 W. A. SCHULTZ 2,582,071
SUSPENDED AIR-HEATING FURNACE
Filed March 11, 1947 4 Sheets-Sheet 1

INVENTOR,
Wilbur A. Schultz
BY
Hull and West
ATTYS.

Jan. 8, 1952      W. A. SCHULTZ      2,582,071
SUSPENDED AIR-HEATING FURNACE

Filed March 11, 1947      4 Sheets-Sheet 2

INVENTOR,
Wilbur A. Schultz
BY
Hull & West
ATTYS.

Jan. 8, 1952  W. A. SCHULTZ  2,582,071
SUSPENDED AIR-HEATING FURNACE
Filed March 11, 1947  4 Sheets-Sheet 3

INVENTOR,
Wilbur A. Schultz
BY
Hull & West
ATTYS.

Jan. 8, 1952 W. A. SCHULTZ 2,582,071
SUSPENDED AIR-HEATING FURNACE
Filed March 11, 1947 4 Sheets-Sheet 4
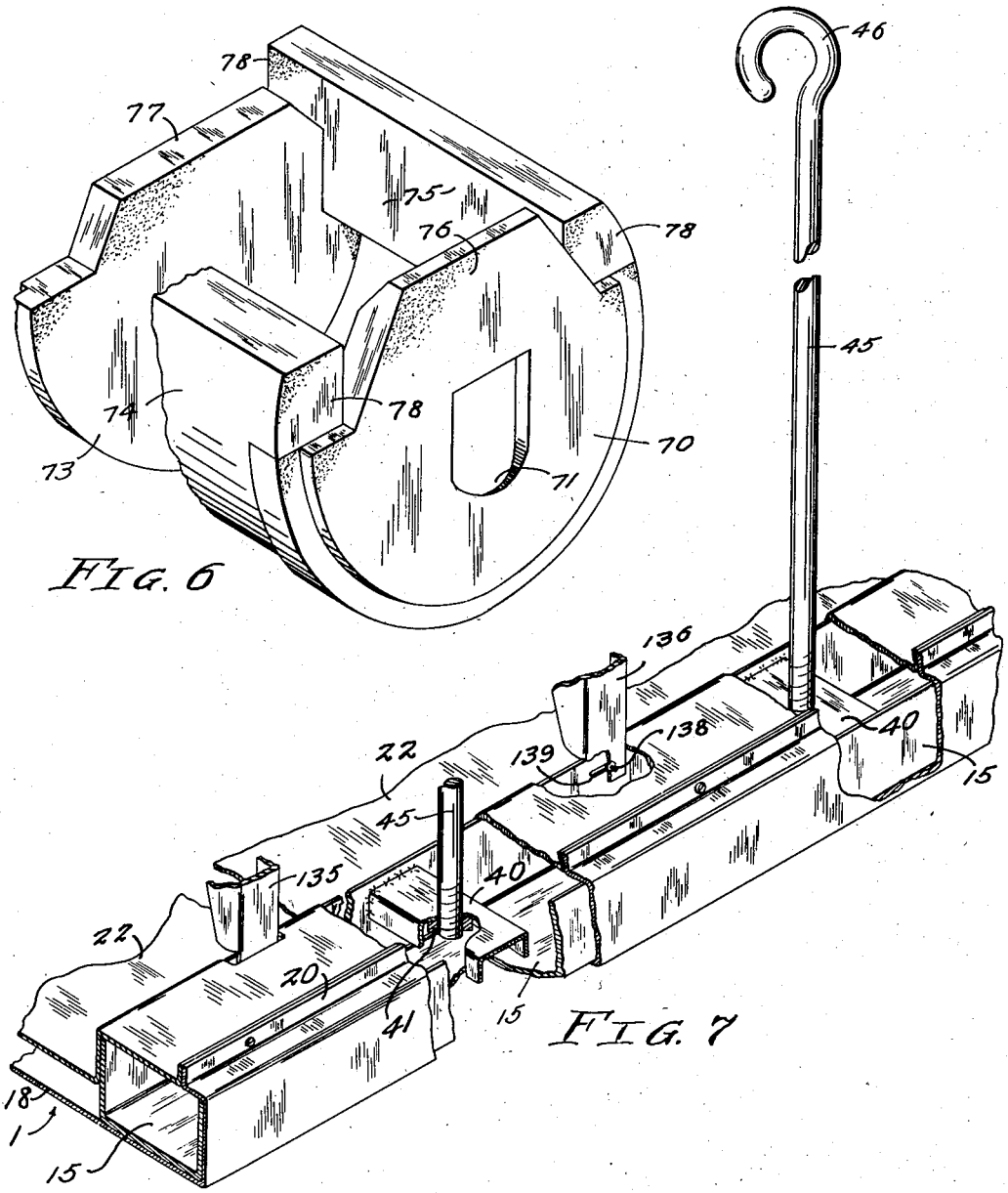
INVENTOR,
Wilbur A. Schultz
BY
Hull & West
ATTYS.

Patented Jan. 8, 1952

2,582,071

UNITED STATES PATENT OFFICE 2,582,071

SUSPENDED AIR-HEATING FURNACE

Wilbur A. Schultz, Lakewood, Ohio, assignor to Perfection Stove Company, Cleveland, Ohio, a corporation of Ohio Application March 11, 1947, Serial No. 733,884

8 Claims. (Cl. 126—116)

This invention relates to heating apparatus. More particularly, it has to do with heating apparatus of the type known as suspended furnaces. Furnaces of this kind are adapted to be hung from overhead supporting means or ceilings, leaving the floor space therebelow unobstructed and therefore available for various uses. Accordingly, suspended furnaces are especially suitable for large open-space heating of stores, small factories, garages, service stations, warehouses, schools, etc. By reason of the nature of such furnaces, fluid fuel is preferable for use therein. In my case, I desire to use liquid fuel, particularly of a grade known as fuel oil.

An object of the invention is the production of a suspended furnace of improved design and construction affording, among others, the following several advantages: compactness; lightness of weight; strength and rigidity of structure; simplicity and cheapness of installation; economy of operation; high efficiency and quick heating; durability; convenient cleaning of parts exposed to the products of combustion, and ready accessibility to all parts requiring servicing.

Another object of the invention is to so dispose the refractory lining of the combustion chamber as to protect the areas of the sheet metal walls of said chamber, whose outer surfaces are not in the direct path of the circulating air, from deterioration by the intense heat of the burner flame; and to leave exposed to said heat the areas whose outer surfaces are wiped by the circulating air and are thus kept from reaching injuriously high temperatures while, by reason of this same condition, heat transfer between the enclosed products of combustion and said circulating air is enhanced.

Another object is to provide a lining for the combustion chamber that is quick and especially convenient of installation and that is made up of refractory members shaped to interengage with one another in such manner as to hold or lock them in place, thereby to render unnecessary the use of cement or sealing material.

I prefer to use a pressure atomizing liquid fuel burner, desirably of the gun type, for firing the furnace; and it is a further object of my invention to reduce to a minimum the flame pulsation that is characteristic of such burners, and this I accomplish by maintaining an especially high temperature in the combustion chamber due to the use of refractories of high insulating quality and by providing, also, controlled pressure relief for said chamber. More specifically, one or more openings are provided in the enclosure of the combustion space, and each such opening is partially closed by a quantity of fibrous material, preferably steel wool. Thus pressure waves originating in the combustion chamber are relieved without undue loss of heat.

A further object is to provide a furnace construction that is readily reversible so as to adapt it to either right or left hand installation. By reason of this feature, the furnace may be assembled for servicing from one side or the other. This object is attained by making the combustion chamber-radiator unit symmetrical above and below its horizontal central plane so that it may be turned over with respect to the casing; by making the opposite side panels of the casing interchangeable, and by providing a burner unit and a refractory lining for the combustion chamber that are adaptable to both positions of the combustion chamber-radiator unit.

A still further and more detailed object of the invention is to incorporate in the bottom of the casing, along each side thereof a stiff beam or channel. The beams or channels support the weight of the combustion chamber-radiator unit and its appurtenances, as well as the remainder of the casing, etc.; and it is to these beams or channels that the furnace suspension elements or hanger bolts are anchored.

An additional object is to provide for convenient and economical installation, at any time, as well as removability for cleaning, of a water heating element; and to so locate the same as to protect it from extremely high temperatures, while insuring effectual heat interchange between the products of combustion and the water.

The foregoing objects and advantages, with others that will appear as this description proceeds, are attained in the embodiment of my invention illustrated in the accompanying drawings wherein like reference characters designate like parts throughout the several views.

Figure 2:
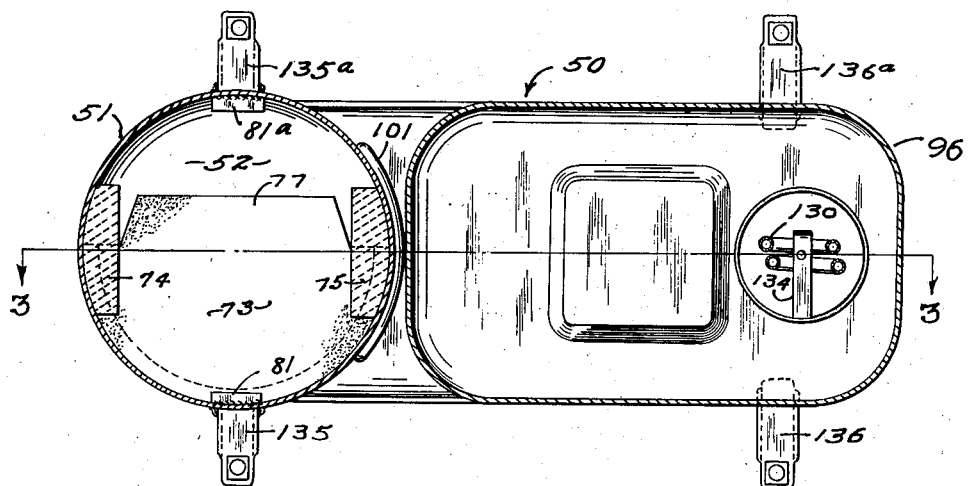
Figure 3:
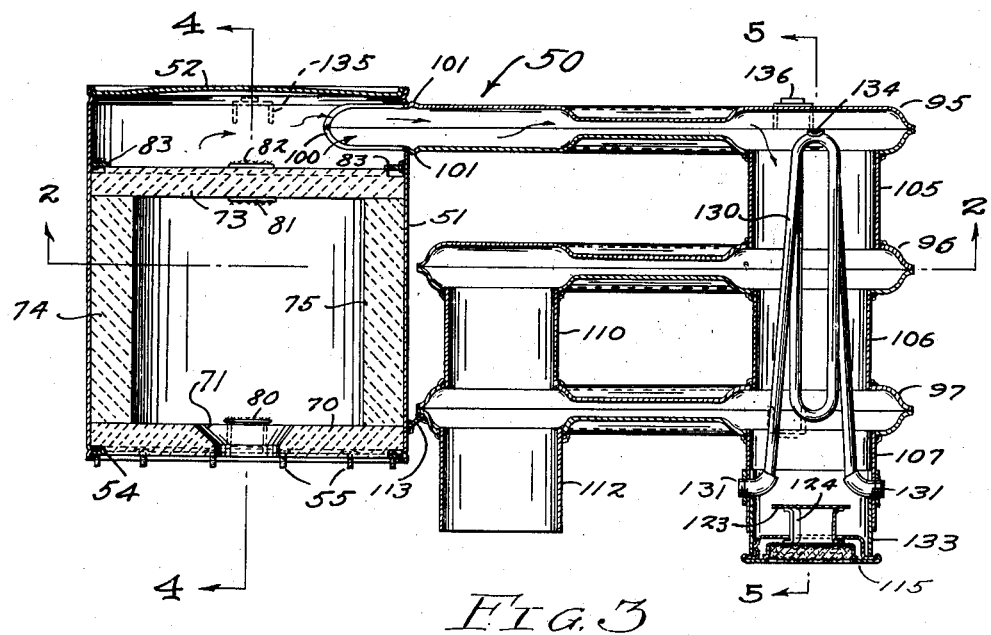
Figure 4:
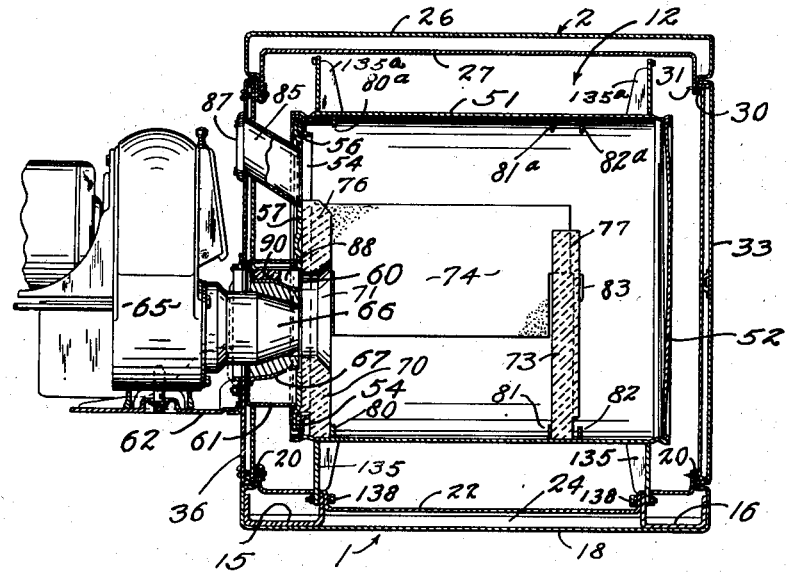
Figure 5:
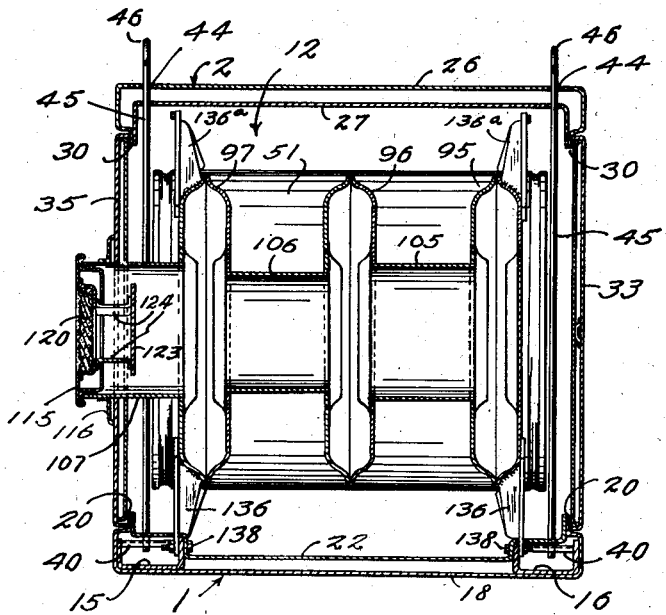

In the drawings, Fig. 1 is a perspective view of the furnace with certain of the side panels broken away to reveal the parts enclosed; Fig. 2 is a vertical central longitudinal section through the combustion chamber-radiator unit, on the line 2—2 of Fig. 3; Fig. 3 is a horizontal central longitudinal section through said unit, on the line 3—3 of Fig. 2; Fig. 4 is a vertical transverse section through the furnace on the center line of the combustion chamber, the plane of section being indicated by the lines 4—4 of Figs. 2 and 3; Fig. 5 is a similar sectional view in a plane represented by the lines 5—5 of Figs. 2 and 3; Fig. 6 is a perspective view of the refractory lining for the combustion chamber, with a part of one of the side members broken away, and Fig. 7 is a fragmentary perspective view of the bottom wall of the casing, showing one of the beams or channels that extends along a side thereof and to which the suspension elements or hanger bolts are anchored.

The furnace, proper, includes three major parts namely: the casing, the combustion chamber-radiator unit, and the air impeller, and I shall now describe them in detail in the order in which they have just been mentioned.

CASING

(Reference numerals 1 to 46)

With particular reference to Figs. 1, 4 and 5, the furnace casing is made up of a bottom wall, designated generally by the reference numeral 1, a top wall 2, and end frames 3 and 4. Each of said frames has a relatively large opening that is surrounded by flanges, the flanges of frame 4 being shown at 5 in Fig. 1.

A partition 8, situated about one-fourth the length of the casing inwardly from the end frame 4, separates the interior of the casing into a heating compartment 12, and a relatively smaller air impeller compartment 14. The foregoing parts of the casing are suitably connected together to form a comparatively rigid structure, and strength and stiffness is imparted to the bottom wall 1, in order to constitute of it a load support, by beams or channels 15 and 16 that extend the entire length of the casing. As best shown in Figs. 4 and 5, said bottom wall is constructed of a sheet of metal, designated 18, that is engaged with the underneath surfaces of the channels 15 and 16, and the edge portions of said sheet are extended upwardly along the outer side flanges of the channels and thence inwardly over the same and again upwardly to provide flanges 20. The bottom wall 1 includes, also, a liner 22 of sheet metal that extends across the space between the channels 15 and 16, in parallel spaced relation to the sheet 18, and along its lateral edges said liner is extended up alongside the inner flanges of the channels and then across the channels to where they are flanged upwardly and engaged with the flanges 20 of the sheet 18. Each end of the sheet 18 is turned upwardly to provide a flange 24 (Fig. 4) that overlaps the corresponding ends of the channels. Thus it will be seen that, by the inclusion of the beams or channels 15 and 16, and the manner in which they are embraced by the edge portions of the sheet 18 and liner 22, a very strong, stiff load support is provided.

The top wall 2 is fabricated of a metal sheet 26, and a liner 27 of similar character. The lateral edge portions of the sheet 26 are turned downwardly and thence inwardly and again downwardly to provide flanges 30, while the edge portions of the liner 27 are turned directly downwardly alongside the flanges 30, to which they are secured by screws 31, the liner elsewhere being disposed in parallel spaced relation to the sheet 26.

With the walls 1 and 2 thus constructed and supported in vertically spaced relation to each other by the end frames 3 and 4 and partition 8, openings are left along the opposite sides of the casing. The open side of the heating compartment 12 on one side of the casing is closed by a double-wall panel 33, that is held in place by screws that are extending through the panel and the flanges 20 and 30, the top and bottom edges of the panel occupying the rabbetted grooves formed by said flanges 20 and 30 and the adjacent right angle portions of the respective sheets 18 and 26. The opposite side of the casing is normally closed by a relatively wide, double wall central panel 35 (Fig. 1), and by narrower panels 36 and 37, the panels 35 and 36 closing the side of the compartment 12, while the panel 37 closes the side of the compartment 14. The latter panel, and a similar one that closes the opposite side of said compartment, for reasons which will presently appear, are desirably made conveniently removable by following the common expedient of equipping their upper ends with parts that interlock with the sides of the top wall, and their lower ends with latch means 38 that cooperate with adjacent parts of the bottom wall. The panels 35 and 36 are fitted within the side of the casing and are connected thereto in the manner of the previously mentioned side panel 33.

Spaced inwardly a suitable distance from each end of each channel 15 and 16, is an anchorage member 40 which, according to the present embodiment, consists of a downwardly opening short channel that is disposed between and is welded at its ends to the side flanges of the corresponding one of the first mentioned channels. Secured as by welding, to the underside of the web of the short channel is a nut 41, and said web has an aperture that registers with the threaded bore of the nut. The top wall 2 of the furnace casing has apertures 44 in vertical alignment with the anchorage members 40, and extended downwardly through the apertures 44 are suspension elements or hanger bolts 45 which have their threaded lower ends screwed into the nuts 41. Said elements or bolts are shown as terminating at their upper ends in hooks 46 for convenient attachment to overhead suspension means.

COMBUSTION CHAMBER-RADIATOR UNIT

(Reference numerals 50 to 90)

Occupying the heating compartment 12 is a combustion chamber-radiator unit that is designated generally by the reference numeral 50. The combustion chamber of said unit is made up in part of a cylindrical wall 51 and a circular end wall 52 that is permanently connected, as by welding, to the rear end of the cylindrical wall 51. Similarly secured to the opposite end of said wall is a flange 54, provided with threaded studs 55 that are spaced apart circumferentially of said flange.

Applied to the flange 54, with a gasket 56 interposed between it and said flange, is the edge portion of the circular front wall 57 of the combustion chamber. Said front wall is provided with holes through which the studs are projected, and nuts 58 are applied to the studs to securely hold said wall 57 to the flange 54. The wall 57 is provided with an opening 60, and secured to said wall about the opening 60 is a substantial frame member 61 to the outer end of which is fastened a bracket 62, mounting a pressure, atomizing, liquid fuel burner of the gun type, designated generally by the reference numeral 65. Inasmuch as the burner, per se, forms no part of the present invention, and is one of well known character, it is deemed unnecessary to illustrate and describe it in detail herein. Said burner includes a nozzle 66, surrounded by a generally cone-shaped member 67 that is carried by the frame member 61. A suitable cement fills the space between the member 67 and the nozzle 66. The action of the burner is automatically governed by the usual electrical control system (not shown) including a room thermostat.

The combustible mixture of atomized oil and air is projected into the combustion chamber within an enclosure of a refractory lining that is composed of four parts, to-wit, a front member 70, which has an inwardly flared opening 71 that registers with the opening 60 in the front wall 51 of the combustion chamber; a rear member 73, and side members 74 and 75. As best shown in Fig. 6, the front member 70 and rear member 73 are substantially identical in shape, being generally semi-circular and having respective upwardly tapering extensions 76 and 77 that rise therefrom. The extensions are of less width than the semi-circular portions of said members, which latter are of a size to fit the interior of the cylindrical wall 51 of the combustion chamber. The side members 74 and 75 have overhanging portions 78 at their upper corners that bear on horizontal ledges of the front and rear members 70 and 73 outwardly beyond their extensions 76 and 77. The outer surface of the side members conform to the shape of the cylindrical wall 51. Considering the manner in which these members of the refractory lining interengage one another, it is apparent that the side members are held in place by the end members, and that the end members are prevented from tilting toward each other by the portions of the side members that extend between them. The side members extend a comparatively short distance above and below the horizontal central plane of the combustion chamber, while the end members contact the peripheral wall of said chamber throughout the extent of their semi-circular portions. The lower portion of the front member 70 is held in place between the flange 54 and a lug 80 that is welded or otherwise attached to, and rises from, the bottom of the combustion chamber, and the lower portion of the rear member 73 is confined between spaced lugs 81 and 82 that are similarly fastened to and rise from the bottom of said chamber. Diametrically opposed lugs 83 that are carried by the sides of the combustion chamber restrain the rear member 73 from tilting backwards. I may mention, in passing, lugs 80ª, 81ª and 82ª that are attached to and depend from the top of the combustion chamber in the vertical planes of the respective lugs 80, 81 and 82, and the purpose of which will presently appear.

As previously explained, the combustible mixture is projected from the nozzle 66 of the burner 65 into the enclosure of the refractory lining, and the condition of the flame may be observed through a sight tube 85, whose inner end opens through the front wall 57 of the combustion chamber, while the front end of said tube opens through the panel 36 where it is fitted with a closure 87, including a transparent central portion. The combustion chamber is vented to the atmosphere through a passage 88 between the upper portion of the cone-shaped member 67 and the top portion of the frame 61, and fluid flow therethrough is checked or retarded by a mass of fibrous material, such as "steel wool," designated 90 that is confined within the outer portion of said passage 88 between suitable screen-like or perforated retainers. This controlled vent for pressure waves that are created within the combustion chamber, plus the high flame temperature maintained by the heat insulating refractory lining, reduces to a minimum the flame pulsation characteristic of pressure atomizing liquid fuel burners of the gun type.

RADIATOR
(Reference numerals 95 to 138)

Turning now to the radiator portion of said unit 50, the same is composed of a plurality of sections, three, in the present embodiment, and I shall designate them the rear section 95, intermediate section 96 and front section 97. Each section is made up of two shells that are drawn from sheet metal and are arranged with their open sides toward each other and their edge portions engaged and welded together. Each shell, throughout its central region, is depressed inwardly into rather close proximity to the corresponding area of the other shell, and by reason of this formation of the shells, the greater quantity of the products of combustion that are circulated through the radiator sections is confined to the peripheral portions thereof. The rear radiator section 95 is longer than the others, and its left hand end (as the parts are viewed in Figs. 2 and 3) is shaped to conform to the cylindrical wall 51 of the combustion chamber. Said wall is provided with a segmental slot 100 into which the end of said radiator section is projected, and said section is properly positioned with respect to the wall 51 by arcuate beads 101.

The front wall of the rear radiator section 95, adjacent its end remote from the combustion chamber, is provided with a relatively large opening that is in axial alignment with an opening of corresponding size in the rear wall of the intermediate radiator section 96; and the front wall of the latter section has a somewhat smaller opening in axial alignment with the opening in its rear wall. The smaller opening, in turn, is aligned with a similar size opening in the rear wall of the front radiator section, and the front wall of the latter section has an opening axially aligned with the former openings and of a size corresponding to the larger ones thereof. The rear radiator section communicates with the intermediate section through a short conduit or so-called stub 105, which has its ends welded or otherwise secured to the front and rear walls of the respective sections in register with the aforesaid openings thereof; and the intermediate and front radiator sections communicate through a stub 106 of somewhat smaller diameter which has its ends similarly attached to the front and rear walls of the present sections in register with their smaller openings. Attached to the front wall of the section 97, in register with the before-mentioned opening thereof, is what may be termed a cleanout stub 107. The ends of the intermediate and front radiator sections adjacent the combustion chamber communicate with each other through a stub 110 that has its ends fastened to the opposed walls of said sections about openings therein, and axially aligned with the stub 110 is what may be termed a flue stub or connection 112 that is attached to the front wall of the radiator section 97 in register with an opening in said wall. To impart strength and rigidity to the combustion chamber-radiator unit, the end of the front radiator section 97 is fastened to the peripheral wall of the combustion chamber by a bridge member 113 that is welded or otherwise secured to said wall and to the radiator section. Access is had to the interior of the radiator at its end remote from the combustion chamber, for cleaning as well as other purposes, through the cleanout stub 107. This stub is equipped with a removable cap 115. Said cleanout stub, as well as the flue stub or connection 112, project through apertures in the panel 35 that are surrounded by collars 116 and 117.

The cap 115 is frictionally engaged within the outer end of the cleanout stub 107 and it is desirably made with a vent opening to relieve pressure waves that are transmitted from the combustion chamber to the radiator. To this end, the cap is provided with a relatively large central opening across which is supported a mass of fibrous material, such as steel wool, as indicated at 120, the same being held in place by a suitable retainer incorporating perforated walls or screens between which the fibrous material is confined. A baffle 123 is supported by the cap in inwardly spaced relation to its inner end, through means of spacers 124.

The cross passage through the radiator, afforded by the aligned stubs 105, 106 and 107, provides for convenient and economical installation of a water heating element or coil at any time. Such an element or coil, as an appurtenance to the furnace, is shown in Figs. 2 and 3. Said element or coil, designated 130, has laterally extended terminal portions 131 that form the water inlet and outlet, and the element or coil is adapted to be projected into said cross passage through the cleanout stub 107 until the portions 131 engage the front end of said stub. This disposes the rear end of the element or coil closely adjacent the radator section 95. A tubular extension 133, notched at its rear end to accommodate the terminal portions 131, is telescoped into the stub 107. A support 134 that is attached to the rear end of he element or coil 130 rests on the bottom of the stub 105. Under the circumstance just described, the cap 115 is fitted into the outer end of the extension 133. It is apparent, therefore, that not only can the water heating element or coil be conveniently installed, but it may be removed with equal facility for cleaning or replacement without disturbing the furnace structure in any way.

The combustion chamber-radiator unit 50 is connected to and supported from the beams or channels 15 and 16 by legs 135 and 136, the former being secured to and depending from the front and rear ends of the combustion chamber, and the latter being attached to and depending from the front and rear sections of the radiator adjacent the end thereof remote from said chamber. The lower ends of said legs are fastened by bolts 138 to the inner flanges of the channels 15 and 16, as best shown in Figs. 4, 5 and 7; and in order to prevent strains and stresses being set up within said unit when it is caused to expand and contract due to extreme temperature changes to which it is subjected from time to time, and to avoid the noises attending such conditions, readily yielding connections are made between certain of the aforesaid legs and the channels 15 and 16. This end is attained in the present instance by making slots in the flanges of the channels 15 and 16 through which the bolts 138 extend that connect the legs 136 to said flanges, one of the slots being shown at 139 in Fig. 7. Legs 135a and 136a rise from the combustion chamber-radiator unit in vertical alignment, respectively, with the legs 135 and 136. The reason for this will presently appear.

AIR IMPELLER

*(Reference numerals 140 to 148)*

The partition 8, which separates the heating compartment 12 from the air impeller compartment 14, is provided with a relatively large circular opening 140, and secured to the partition in register with said opening is a cylindrical casing 141. The end of said casing adjacent the partition is provided with a flange that is secured by fastening means 142, such as screws or bolts, to the partition. A relatively large fan 145, of the propeller type, is rotatably supported by and within the cylindrical casing 141, and is driven, through a belt 146, by an electric motor 148 that is mounted in the lower portion of the compartment 14 adjacent the side of the furnace on which the burner, flue and cleanout are located, so that the furnace may be serviced entirely from one side. Access to the motor, as well as to the fan, is had through the open side of the casing when the panel 37 is removed.

While I have shown the air impeller as consisting of a more or less common type of axial flow fan, such being desirable in the present construction, it will be understood that other types of air impellers may be employed without departing from the invention.

ASSOCIATED EQUIPMENT

*(Reference numerals 150 to 162)*

Attached to the end frame 4 of the casing 1 is a filter housing 150. The wall 151 of this housing that is opposite the end frame 4 is provided with a large rectangular opening 152; and arranged in zigzag fashion within the housing are frames 153 that support air filters 155. These filters may be of any approved character, such as those in common use which are made of fiber glass or the like confined within inexpensive holders. The side panels 156 of the filter housing are readily removable, being made to interengage at their upper ends with the adjacent edges of the top of the housing, while their lower ends are provided with latches 157 by which they are held to the ends of the bottom wall 158.

Fastened in any approved manner to the end frames 3 of the casing 1 is a plenum chamber 160 from which, by suitable ducts, the heated air may be distributed as desired. A flue 162 is connected to the flue stub or connection 112.

With the burner 65 in operation, the products of combustion will flow over the refractory lining member 73 and into the rear radiator section 95 and thence through the stub 105 to the intermediate radiator sections 96. A part of the products will circulate through the section 96 while the remainder will pass on through the somewhat smaller stub 106 to the radiator section 97. Circulating through the latter section, said products will be joined by those escaping from the intermediate section through the stub 110 and all will escape through the stub or connection 112 to the flue. While passing through each radiator section, the greater volume of the products will tend to follow the peripheral portion of the section for reasons already explained. Due to the high temperature of the products as they escape from the combustion chamber, the rear radiator section 95 is desirably made of heat-resisting non-corrosive chrome steel, the same as the metal walls of the combustion chamber.

With the air impeller in operation, cool air is drawn in through the filters 155 that are supported within and across the housing 150 and is forced through the casing 1 about the combustion chamber-radiator unit. The circulating air will wipe all sides of all of the radiator sections and pass over, beneath and about the ends of the combustion chamber, with the two-fold effect of causing the air to be highly heated and preventing the portions of the walls of the unit 50 wherewith the air contacts, from attaining injuriously high temperatures. As the air stream, having passed the radiator, divides and flows over and under the cylindrical combustion chamber and merges again therebeyond, substantially dead air pockets are created along the sides of said chamber in the region of its horizontal central plane. The areas of the peripheral wall of the combustion chamber adjacent these dead air pockets, lacking the cooling influence of the circulating air, are protected from the intense heat of the burner flame by the side members 74 and 75 of the refractory lining.

As previously explained, the parts of the furnace which may require attention or servicing are all located on one side—the right side, in the present instance, when the furnace is viewed from the left of Fig. 1. However, conditions sometimes require that the furnace be capable of being serviced from the left side. To meet such conditions, the combustion chamber-radiator unit 50 is made symmetrical above and below its central horizontal plane so that it may be inverted, in which case the legs 135ª and 136ª are fastened, by the bolts 138, to the beams or channels 15 and 16. Also, the end wall 57 is inverted with respect to the combustion chamber so that, in its new position, the parts associated therewith are in the upright position they previously occupied. Such a conversion of the furnace obviously requires removal and replacement of the burner 65, wall 57, and the parts of the refractory lining, in which case, with the combustion chamber casing inverted the lower portions of the front and rear members 70 and 73 are now held in place by the lugs 81ª and 82ª. To complete the reversal of the furnace, the side panel 33 is interchanged with the panels 35 and 36, and the motor 148 is shifted to the opposite side of the compartment 14.

Having thus described my invention, what I claim is:

1. In a furnace construction, an elongated rectangular casing including top and bottom walls, an invertible combustion chamber-radiator unit supported within the casing, the corresponding sides of the combustion chamber and radiator having, respectively, provisions for the accommodation of a burner and a flue connection, and closure means interchangeable between the two sides of the casing, said means for one side having openings for the burner and flue connection.

2. In a furnace construction, an elongated rectangular casing including a top wall and a bottom wall, means for supporting said casing in a substantially horizontal position, an invertible combustion chamber-radiator unit supported in the casing, the radiator of said unit including a flue connection on one side thereof, the wall of the combustion chamber on the corresponding side of the unit being detachable and being reversible with respect to the unit, a burner supported in fixed relation to said detachable wall, a sectional refractory lining removably supported within the combustion chamber and capable of being reversed with respect to the chamber, and closure means interchangeable between the two sides of the casing, the closure means for one side having openings for the accommodation of the burner and flue connection.

3. In a furnace construction, an elongated rectangular casing including a top wall and a bottom wall, means for supporting said casing in a substantially horizontal position, an invertible combustion chamber-radiator unit supported in the casing, the radiator of said unit including a flue connection and a cleanout stub on one side thereof, the wall of the combustion chamber on the corresponding side of the unit being detachable and being reversible with respect to the unit, a burner supported in fixed relation to said detachable wall, a sectional refractory lining removably supported within the combustion chamber and capable of being reversed with respect to the chamber, closure means interchangeable between the two sides of the casing, the closure means for one side having openings for the accommodation of the burner, flue connection and cleanout stub, and a cap for said stub.

4. In a furnace construction, an elongated rectangular casing, a combustion chamber-radiator unit situated in the casing, the combustion chamber comprising a substantially cylindrical sheet metal peripheral wall and sheet metal end walls attached thereto, and said radiator consisting of a plurality of hollow sheet metal sections that are arranged side by side in spaced relation to each other, the sections being relatively thin and of a width substantially equal to the diameter of the combustion chamber and of a length considerably greater than said diameter, said radiator sections being arranged in parallel spaced relation with the sections lying in vertical planes normal to the axis of the combustion chamber, one of the end sections of the radiator being extended and joined to the cylindrical wall of the combustion chamber adjacent an end of the latter, the remote end of the combustion chamber having an opening for the accommodation of a burner, a fluid fuel pressure burner of the gun type supported in a position to project its products through said opening into the combustion chamber, the opposite end section of the radiator having a flue conection adjacent its end nearest the combustion chamber, stubs in the form of short conduits communicatively connecting together the ends of the radiator sections remote from the combustion chamber, said stubs being substantially in axial alignment, the last mentioned end section of the radiator having a cleanout opening aligned with said stubs, a closure for said cleanout opening, and an air impeller for moving air through the casing in a direction to first pass about the radiator sections and about the combustion chamber.

5. In a furnace construction, the combination of elements set out in claim 4, plus: an elongated water circulating element adapted to be projected into the radiator through said cleanout opening and to be accommodated by said stubs.

6. In a furnace construction, a casing including top and bottom walls and detachable side panels, beams extending along and incorporated in the lateral edges of the bottom wall, elongated suspension elements inwardly of the side panels and spaced apart along each beam and having their lower ends anchored thereto, the top panel having apertures through which the upper ends of the suspension elements are exposed for connection with external suspension means, and a combustion chamber and radiator attached to and supported by said beams inside the casing.

7. In a furnace construction, a casing including top and bottom walls and detachable side panels, end frames rigidly connecting said walls together in vertically spaced relation, a channel extending along and incorporated in each lateral edge of the bottom wall, anchorage members fixed within each channel, one in spaced relation to each end thereof, the top panel having an aperture in substantially vertical alignment with each of the anchoring members, suspension bolts extending downwardly through said apertures inwardly of the side panels and having their lower ends secured to said anchorage members, and a combustion chamber and radiator in the casing attached to and supported by said channels.

8. In a furnace construction, a casing comprising top and bottom walls, end frames rigidly connecting said walls together in vertically spaced parallel relation, an upwardly opening channel extending along and incorporated in each lateral edge of the bottom wall, anchorage members secured to and bridging each channel, one in spaced relation to each end thereof, said anchorage members having threaded holes, the top panel having an aperture in substantially vertical alignment with each of said holes, suspension bolts extending downwardly through said apertures and having their lower ends threaded and screwed into the holes of the anchorage members, a combustion chamber and radiator in the casing attached to and supported by said channels, and side panels for the casing supported between the lateral edges of the top and bottom walls.

WILBUR A. SCHULTZ.

REFERENCES CITED

The following references are of record in the file of this patent:

UNITED STATES PATENTS

| Number | Name | Date |
|---|---|---|
| 1,720,239 | Reznor | July 9, 1929 |
| 1,933,330 | Johnson | Oct. 31, 1933 |
| 1,943,596 | Franke | Jan. 16, 1934 |
| 2,012,210 | Williams | Aug. 20, 1935 |
| 2,038,654 | Grazier | Apr. 28, 1936 |
| 2,130,894 | Muir | Sept. 20, 1938 |
| 2,240,161 | Mueller | Apr. 29, 1941 |
| 2,259,187 | Turnbull | Oct. 14, 1941 |
| 2,302,859 | Hare | Nov. 24, 1942 |
| 2,388,364 | Page et al. | Nov. 6, 1945 |
| 2,410,881 | Hunter | Nov. 12, 1946 |
| 2,470,860 | Parrish | May 24, 1949 |